(No Model.) 2 Sheets—Sheet 1.

L. WISMER.
BEEHIVE.

No. 499,490. Patented June 13, 1893.

Witnesses:
C. H. Raeder.
G. M. Copenhaver.

Inventor
Levi Wismer
By James J. Sheehy
Attorney

THE NORRIS PETERS CO., PHOTO-LITHO., WASHINGTON, D. C.

(No Model.) 2 Sheets—Sheet 2.
L. WISMER.
BEEHIVE.

No. 499,490. Patented June 13, 1893.

Witnesses:
H. Rader
G. M. Copenhaver.

Inventor
Levi Wismer
By James J. Sheehy
Attorney

UNITED STATES PATENT OFFICE.

LEVI WISMER, OF REDMAN, MICHIGAN.

BEEHIVE.

SPECIFICATION forming part of Letters Patent No. 499,490, dated June 13, 1893.

Application filed January 15, 1892. Renewed May 12, 1893. Serial No. 474,032. (No model.)

*To all whom it may concern:*

Be it known that I, LEVI WISMER, a citizen of the United States, residing at Redman, in the county of Huron and State of Michigan, have invented certain new and useful Improvements in Beehives; and I do declare the following to be a full, clear, and exact description of the invention, such as will enable others skilled in the art to which it appertains to make and use the same.

My invention has relation to improvements in bee hives and its novelty will be fully understood from the following description and claim when taken in connection with the accompanying drawings in which—

Figure 1:
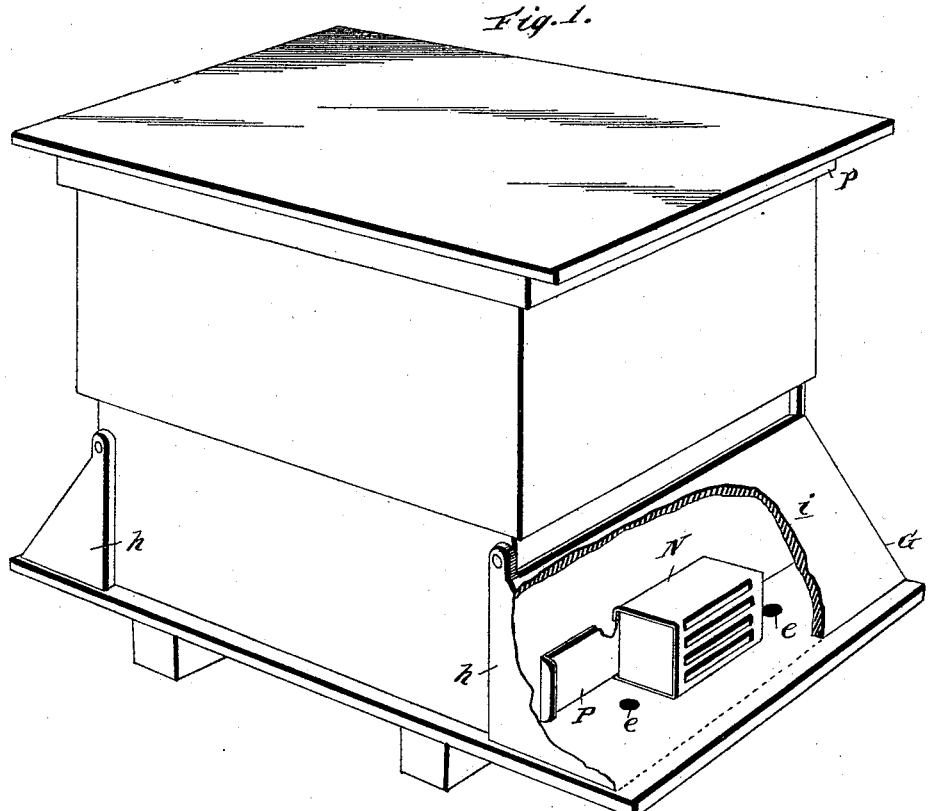
Figure 2:
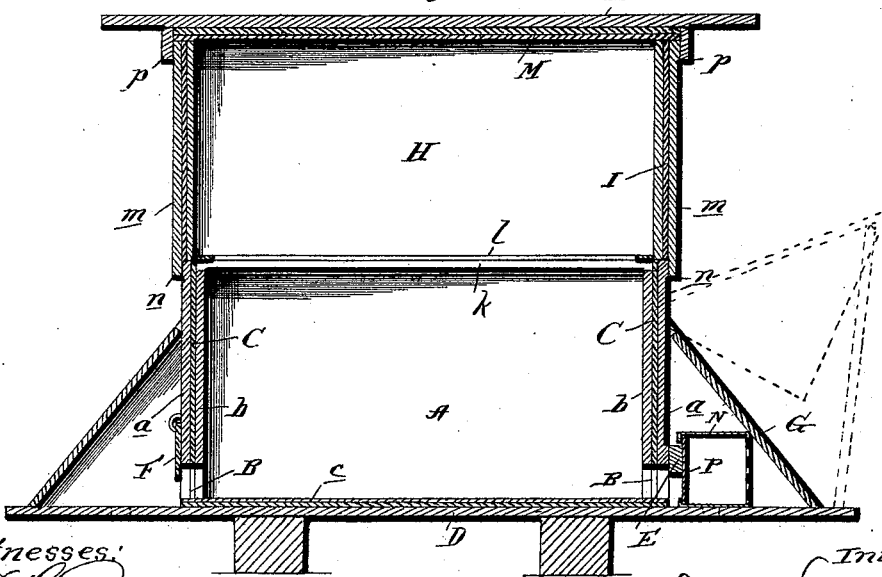
Figure 3:
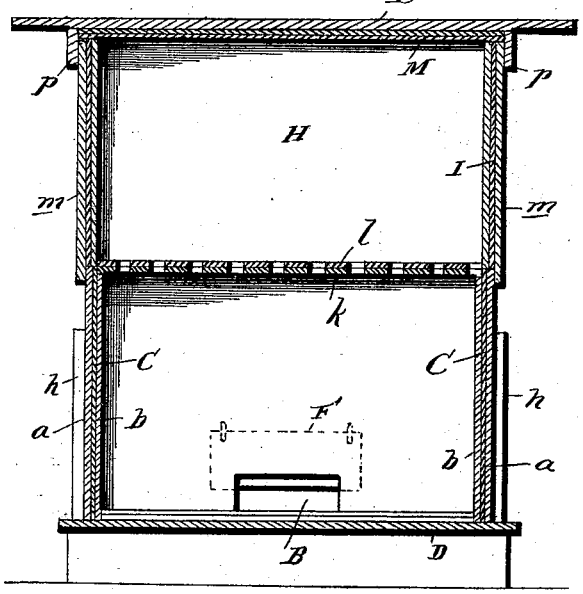

Figure 1, is a perspective view of my improved hive, showing one of the shelter and trap doors partly broken away so as to illustrate the trap box in position. Fig. 2, is a vertical, longitudinal sectional view of the same. Fig. 3, is a transverse vertical sectional view, and Fig. 4, is an end view.

Referring by letter to said drawings: A, indicates the brood chamber which may be of rectangular or other suitable form in outline. This brood chamber has its vertical walls composed of a double thickness with an interior space between them. These walls are preferably formed of lumber about a half inch thick and are properly joined together so as to form a durable structure. The outer walls $a$, as well as the inner walls $b$, at the opposite lower ends of the hive are provided with an entrance B, for the passage of the bees.

C, indicates a filling of felt, paper, or the like. This filling C, is preferably laid within the space formed by the walls $a$, and $b$, in the form of sheets so that should it be desirable to remove one or more it will not become necessary to reconstruct the walls of the hive. The brood chamber is supported upon a horizontal base D, which is of greater length than said chamber so as to form a support or rest for the bees before passing into the hive and the brood chamber has laid upon its floor one or more sheets of paper or felt $c$; there being two sheets shown in the present illustration although more or less may be used. The base D, which is designed to rest upon a situable support as shown so as to keep it from contact with the ground is provided at opposite ends and exterior to the hive with vertically ventilating apertures $e$.

Figure 4:
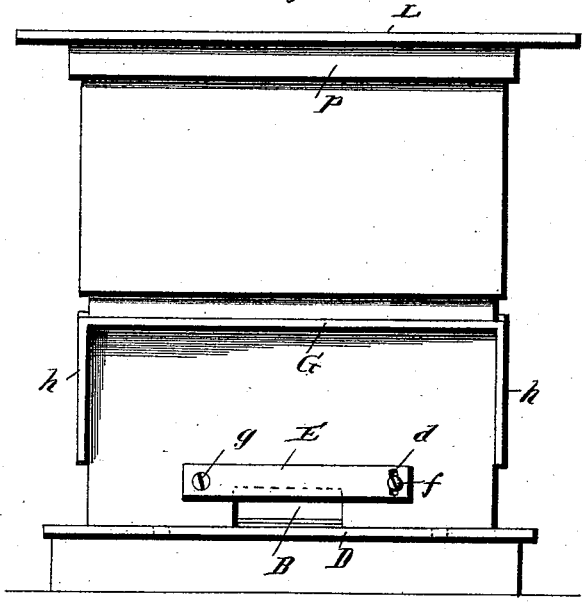

By special reference to Fig. 4, of the drawings, it will be seen that I have provided a drone excluding bar E, for regulating the size of one of the openings B. This bar is provided at one end with a transverse vertically disposed slot $d$, through which a screw $f$, passes and takes into the wall of the brood chamber so as to guide said bar in its vertical movements. The opposite end of this bar is pivoted as shown at $g$. By the provision of the bar E, I am enabled to regulate the said opening B, the said bar E, being raised when it is desired to let the drones escape and lowered when it is desired to prevent their return.

On the opposite end of the brood chamber to that carrying the bar E, I have pivoted over the entrance B, a door or flap F, which is designed to partly close said opening from the outer side so that while the working bees may pass in and out the drones will be prevented from entering although they may pass out should they by other means gain entrance to the brood chamber as the flap may be raised in passing from within, outwardly, but will only tend to close in any effort to gain an entrance from without inwardly.

G, indicates a hood which is composed of the approximately V-shaped sides $h$, and the transverse wall $i$, connecting the same. I provide one of these hoods for each end of the hive or brooding chamber and they are designed to be raised and supported in the position shown by dotted lines to form a shelter for each entrance in warm weather and lowered as shown in full lines to close the entrances in cold or frosty weather. These hoods are pivoted at the upper end of the side walls $h$, to the side walls of the brood chamber and when let down to cover the entrances, the walls $h$, are designed to overlap the walls of the brood chamber as shown. It will be seen that the opposite inner walls $b$, are of a slightly less height than the outer walls $a$, so as to receive upon their edges the bars $k$, which form the roof of the brood chamber, and these bars are covered with a sheet of paper or felt $l$, having perforations or slots sufficiently small to prevent the entrance of the queen or drones into the honey chamber.

H, indicates the honey chamber. This honey chamber has its walls of a double thickness and constructed in a manner similar to the brood chamber with a filling I, of felt, paper or similar material. The honey chamber has its outer walls m, depending below the inner walls as shown at n, so as to slightly overhang the outer walls of the brood chamber and form a tight joint where the two chambers meet.

L, indicates the top for the honey chamber. This top is removable and is provided with a shallow depending flange p, designed to overlap the upper edge walls of the honey chamber and within this flange the top is provided with paper M, or similar material. It will thus be seen that all of the walls of both the brood chamber and honey chamber are provided with paper or felt in addition to the wood employed.

The removable top L, is of a greater length and width than the honey chamber as shown, so as to form an additional means of shelter for the hive.

In order to effect the capture of the queen, I have provided a trap, as better shown in Fig. 1, of the drawings. This trap is composed of a box N, having closed top, end and bottom walls and a slotted or perforated front wall, the slots or perforations being sufficiently large to permit the ingress and egress of the working bees but prevent the drones or queen from passing through. This box which is designed to be placed over the entrance to the hive is provided with an open back covered by a slide P, which may be closed when the queen bee has entered the box and the box may then be removed as a precaution against swarming. By this means I am enabled to regulate the said opening or entrance so as to keep out the drones, but allow the honey bees to enter and escape.

From the construction described and illustrated it will be seen that I have a bee hive in which the temperature may be kept approximately at a standard heat and the parts are so connected and arranged that the hive may be readily cleaned and the honey removed without disturbing the bees. In warm weather the hoods G, are raised and supported by props or the like, as shown in dotted lines, and will serve as a shelter from the sun but allow the air to enter. In cold or frosty weather the hoods may be closed down when they will keep the hive dark but by means of the holes e, air will be allowed to enter and thoroughly ventilate the respective chambers.

Having described my invention, what I claim is—

In a bee hive, the combination with the brood chamber having openings at its ends, and the base D, of a greater length than the brood chamber and having vertically disposed apertures in its extended portions, of the hoods pivotally connected to the side walls of the brood chamber and respectively comprising the approximately V-shaped sides h, and the transverse wall i, the said hoods being designed to be raised and supported to form a shelter for the entrances in warm weather, and lowered to close said entrances in cold or frosty weather, substantially as specified.

In testimony whereof I affix my signature in presence of two witnesses.

LEVI WISMER.

Witnesses:
CHARLES E. THOMPSON,
JOHN H. WHITE.